United States Patent
Vido et al.

(10) Patent No.: US 11,268,281 B2
(45) Date of Patent: *Mar. 8, 2022

(54) ROOFING UNDERLAYMENT WITH ENHANCED WALKABILITY AND TRACTION

(71) Applicant: Owens Corning Intellectual Capital, LLC, Toledo, OH (US)

(72) Inventors: Martin Vido, Surrey (CA); Zhenchao Sun, Westerville, OH (US); Jason Woodall, Hebron, OH (US); Stephanie Pruzinsky, Newark, OH (US); Steve Thaxton, Granville, OH (US); Sabrina DiFilippo, Pickerington, OH (US); Chris Robinson, Perrysburg, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,026

(22) Filed: Jun. 23, 2020

(65) Prior Publication Data
US 2020/0399903 A1  Dec. 24, 2020

Related U.S. Application Data

(60) Provisional application No. 62/865,572, filed on Jun. 24, 2019.

(51) Int. Cl.
*B32B 27/12* (2006.01)
*E04D 12/00* (2006.01)
(Continued)

(52) U.S. Cl.
CPC .......... *E04D 12/002* (2013.01); *B32B 5/022* (2013.01); *B32B 5/024* (2013.01); *B32B 5/26* (2013.01); *B32B 27/12* (2013.01); *B32B 2255/02* (2013.01); *B32B 2255/10* (2013.01); *B32B 2255/26* (2013.01); *B32B 2262/0253* (2013.01);
(Continued)

(58) Field of Classification Search
CPC .......... B32B 2255/02; B32B 2255/10; B32B 2255/26; B32B 2262/023; B32B 2262/0246; B32B 2262/0253; B32B 2262/0261; B32B 2262/0276; B32B 2262/0292; B32B 2262/101; B32B 2307/718; B32B 2419/06; B32B 27/12; B32B 27/302; B32B 27/308; B32B 27/32; B32B 27/34; B32B 27/36; B32B 27/365; B32B 27/40; B32B 5/022; B32B 5/024; B32B 5/26; E04D 12/002
See application file for complete search history.

(56) References Cited

U.S. PATENT DOCUMENTS

5,130,178 A  7/1992  Zerfass et al.
5,204,165 A  4/1993  Schortmann
(Continued)

*Primary Examiner* — Lawrence D Ferguson
(74) *Attorney, Agent, or Firm* — Calfee, Halter & Griswold LLP (57) ABSTRACT

A roofing underlayment with enhanced walkability and/or traction is provided. The roofing underlayment includes a base layer, a first coating layer adhered to a first surface of the base layer, and a melt-blown nonwoven layer adhered to the first coating layer. The melt-blown nonwoven layer enhances walkability by providing a rough surface on which roofing installers may walk.

22 Claims, 2 Drawing Sheets

(51) Int. Cl.
   *B32B 5/02* (2006.01)
   *B32B 5/26* (2006.01)

(52) U.S. Cl.
   CPC ..... *B32B 2307/718* (2013.01); *B32B 2419/06* (2013.01)

(56) References Cited

U.S. PATENT DOCUMENTS

| | | |
|---|---|---|
| 5,308,691 A | 5/1994 | Lim et al. |
| 5,616,408 A | 4/1997 | Oleszczuk et al. |
| 5,939,341 A | 8/1999 | Brown et al. |
| 6,296,912 B1 | 10/2001 | Zickell |
| 6,764,968 B1 | 7/2004 | Hindi et al. |
| 6,864,194 B2 | 3/2005 | Hindi et al. |
| 6,925,766 B2 | 8/2005 | Di Pede |
| 7,148,160 B2 | 12/2006 | Porter |
| 7,718,558 B2 | 5/2010 | Galvin |
| 7,786,028 B2 | 8/2010 | Souther et al. |
| 7,803,725 B2 | 9/2010 | Payne et al. |
| 7,882,671 B2 | 2/2011 | Bruce et al. |
| 7,919,420 B2 | 4/2011 | Bomemann et al. |
| 7,977,259 B2 | 7/2011 | Ratcliff et al. |
| 8,349,103 B2 | 1/2013 | Suzuka et al. |
| 8,765,251 B2 | 7/2014 | Strait |
| 9,314,994 B2 | 4/2016 | Strait |
| 9,415,563 B2 | 8/2016 | Li |
| 9,540,820 B2 | 1/2017 | Kalkanoglu et al. |
| 10,161,063 B2 | 12/2018 | Westwood |
| 10,161,129 B2 | 12/2018 | Hickie et al. |
| 2002/0055316 A1 | 5/2002 | Araida et al. |
| 2004/0023585 A1* | 2/2004 | Carroll ............ B32B 27/12 442/381 |
| 2006/0228962 A1 | 10/2006 | Souther et al. |
| 2007/0194482 A1 | 8/2007 | Douglas et al. |
| 2007/0275621 A1 | 11/2007 | Bennett et al. |
| 2010/0056004 A1 | 3/2010 | Galvin et al. |
| 2010/0077684 A1 | 4/2010 | Socha |
| 2010/0173110 A1 | 7/2010 | Wiercinski et al. |
| 2011/0009024 A1 | 1/2011 | Clark |
| 2018/0355617 A1 | 12/2018 | Granovsky et al. |

\* cited by examiner

ROOFING UNDERLAYMENT WITH ENHANCED WALKABILITY AND TRACTION

CROSS REFERENCE TO RELATED APPLICATIONS

This application claims priority to and any other benefit of U.S. Provisional Patent Application No. 62/865,572, filed Jun. 24, 2019, the entire contents of which are incorporated by reference herein.

FIELD

The general inventive concepts relate to underlayments and, more particularly, to a roofing underlayment configured to enhance walkability and/or traction.

BACKGROUND

Underlayments are commonly used in roofing applications along with an overlayment roofing material, such as asphalt shingles, slate tiles, wooden shakes, metal roofing, and so forth. Underlayments are generally secured to the roof deck and provide the first protection against water infiltration into the interior structure of a building during construction and subsequently become a secondary barrier to water infiltration into the interior upon installation of the primary overlayment roofing material.

A primary drawback of certain underlayments, such as conventional synthetic roofing underlayments, is that the surface of such underlayments is smooth and poses a slipping hazard, particularly during wet, humid, and/or dusty conditions. The smooth surface associated with such underlayments creates a hazardous working condition for roofing installers who must walk upon the underlayments to install roofing materials.

SUMMARY

The general inventive concepts relate to a roofing underlayment that is configured to enhance walkability and/or traction. To illustrate various aspects of the general inventive concepts, several exemplary embodiments of the roofing underlayment are disclosed.

In one exemplary embodiment, a roofing underlayment includes a base layer, a first coating layer adhered to a first surface of the base layer, and a melt-blown nonwoven layer adhered to the first coating layer. The melt-blown nonwoven layer enhances walkability by providing a rough surface on which roofing installers may walk.

In one exemplary embodiment, a roofing underlayment includes a base layer, a first coating layer adhered to a first surface of the base layer, a first melt-blown nonwoven layer adhered to the first coating layer, and a second melt-blown nonwoven layer adhered to a second surface of the base layer. The first melt-blown nonwoven layer enhances walkability by providing a rough surface on which roofing installers may walk, and the second melt-blown nonwoven layer enhances traction by providing a rough surface that grips a roof deck when installed.

Other aspects, advantages, and features of the general inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts relate to roofing underlayments configured to enhance walkability and/or traction. The term "walkability" as used herein refers to foot traction or the ability of an installer to walk upon a roofing underlayment without slipping. The term "traction" as used herein refers to the ability of a roofing underlayment to resist movement relative to a substrate on which it rests, such as a roof deck. As will be described in further detail below, enhanced walkability and/or traction is achieved by incorporating at least one melt-blown nonwoven layer into the roofing underlayment.

Figure 1:
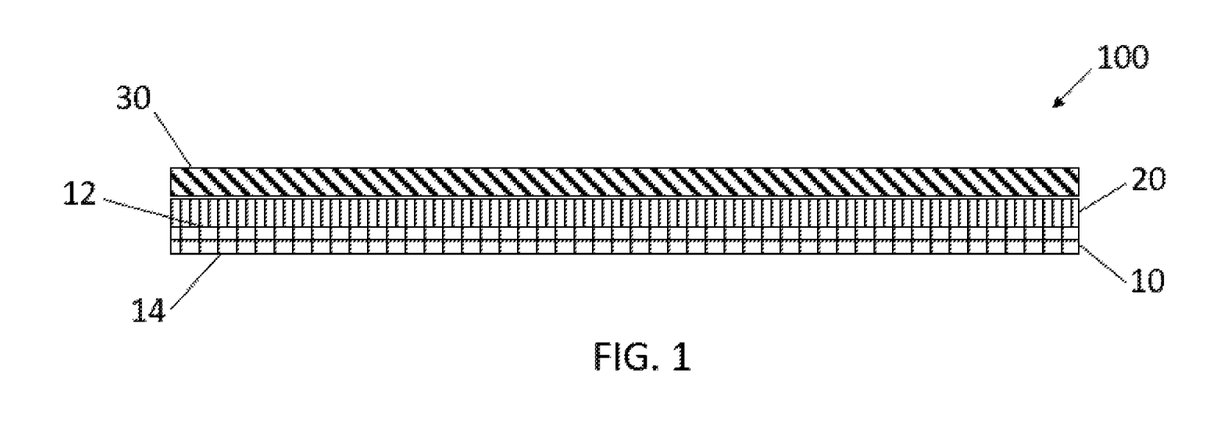
FIG. 1 is a cross-sectional view of an embodiment of a roofing underlayment according to the present disclosure.

In one exemplary embodiment, a roofing underlayment 100 is provided. Referring to FIG. 1, the roofing underlayment 100 comprises a base layer 10 having a first surface 12 (e.g., a top surface) and a second surface 14 (e.g., a bottom surface), and a first coating layer 20 adhered to the first surface 12 of the base layer 10. The roofing underlayment 100 also includes a melt-blown nonwoven layer 30 adhered to the first coating layer 20.

The base layer 10 of the present disclosure may be formed from a variety of materials, most typically one or more polymeric materials. Exemplary materials suitable for forming the base layer 10 of the present disclosure include, but are not limited to, a polyolefin (e.g., polyethylene, polypropylene), a polyester, a glass (e.g., woven glass mat, nonwoven glass mat), a polystyrene, a polyamide, a polyurethane, a polycarbonate, an ethylene-acrylic copolymer, and combinations thereof. The material used to form the base layer 10 of the present disclosure may be a virgin material, a recycled/reprocessed material, and combinations thereof. In certain embodiments, the base layer 10 comprises a polyolefin. In certain embodiments, the base layer 10 comprises at least one of a polypropylene and a polyethylene. The base layer 10 of the present disclosure may also comprise additives such as colorants, pigments, antioxidants, U.V. stabilizers, fire retardants, fillers, and the like.

The base layer 10 of the present disclosure may be structured in a variety of ways. For example, the base layer 10 may be a woven material, a nonwoven material, or a film material. In general, the base layer 10 of the present disclosure has a basis weight of 25 g/m$^2$ to 250 g/m$^2$, including a basis weight of 50 g/m² to 250 g/m², a basis weight of 75 g/m² to 250 g/m², a basis weight of 100 g/m² to 250 g/m², a basis weight of 125 g/m² to 250 g/m², a basis weight of 135 g/m² to 250 g/m², a basis weight of 150 g/m² to 250 g/m², a basis weight of 175 g/m² to 250 g/m², a basis weight of 200 g/m² to 250 g/m², and also including a basis weight of 210 g/m² to 230 g/m². In certain embodiments, the base layer 10 is a nonwoven material, preferably a spunbond nonwoven material, comprising a polypropylene and has a basis weight of 130 g/m² to 250 g/m². In certain embodiments, the base layer 10 is a nonwoven material, preferably a spunbond nonwoven material, comprising a polypropylene and has a basis weight of 135 g/m² to 250 g/m². In certain embodiments, the base layer 10 is a nonwoven material, preferably a spunbond nonwoven material, comprising a polypropylene and has a basis weight of 140 g/m² to 250 g/m². In certain embodiments, the base layer 10 is a nonwoven material, preferably a spunbond nonwoven material, comprising a polypropylene and has a basis weight of 150 g/m² to 250 g/m². In certain embodiments, the base layer 10 is a spunbond nonwoven material having a basis weight of 135 g/m² to 145 g/m² and comprises a polypropylene.

In certain embodiments, the base layer 10 is a woven material, preferably a scrim, comprising a polypropylene and has a basis weight of 25 g/m² to 105 g/m². In certain embodiments, the base layer 10 is a woven material, preferably a scrim, comprising a polypropylene and has a basis weight of 25 g/m² to 75 g/m². In certain embodiments, the base layer 10 is a woven material, preferably a scrim, comprising a polypropylene and has a basis weight of 90 g/m² to 105 g/m². In certain embodiments, the base layer is a woven scrim having a basis weight of 90 g/m² to 105 g/m² and comprises 84% to 94% by weight polypropylene, 4% to 14% by weight filler (e.g., calcium carbonate), and 0.25% to 2% by weight U.V. stabilizer.

With continued reference to FIG. 1, the roofing underlayment 100 of the present disclosure includes a first coating layer 20 adhered to the first surface 12 of the base layer 10. The first coating layer 20 of the present disclosure is generally water impermeable and may be formed from a variety of materials, most typically one or more polymeric materials. Exemplary materials suitable for forming the first coating layer 20 of the present disclosure include, but are not limited to, a polyolefin (e.g., polyethylene, polypropylene), a polyester, a polystyrene, a polyamide, a polyurethane, a polycarbonate, an ethylene-acrylic copolymer, an adhesive (e.g., hot melt adhesive), a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), and combinations thereof. The material used to form the first coating layer 20 of the present disclosure may be a virgin material, a recycled/reprocessed material, and combinations thereof. In certain embodiments, the first coating layer 20 comprises a polyolefin. In certain embodiments, the first coating layer 20 comprises at least one of a polypropylene and a polyethylene. In certain embodiments, the first coating layer 20 comprises a thermoplastic elastomer and a polyolefin, such as a polypropylene and/or a polyethylene. The first coating layer 20 of the present disclosure may also comprise additives such as colorants, pigments, antioxidants, U.V. stabilizers, fire retardants, fillers, and the like.

The first coating layer 20 of the present disclosure may be structured in a variety of ways. For example, the first coating layer 20 may be a woven material, a nonwoven material, or a film material. In certain embodiments, the first coating layer 20 is a film material that is formed using an extrusion process. For example, the first coating layer 20 is applied between the base layer 10 and the melt-blown nonwoven layer 30 as a curtain of molten polymer material, which is laminated together to form the roofing underlayment 100. Thus, in addition to providing a water impermeable layer, the first coating layer 20 may also function as an adhesive to join the base layer 10 to the melt-blown nonwoven layer 30. In certain embodiments, the coating layer 20 of the present disclosure has a basis weight of 14 g/m² to 50 g/m², including a basis weight of 20 g/m² to 45 g/m², a basis weight of 25 g/m² to 40 g/m², and also including a basis weight of 25 g/m² to 35 g/m².

In certain embodiments, the first coating layer 20 is a film material, preferably formed using an extrusion process, comprising at least one of a polypropylene and a polyethylene, and having a basis weight of 20 g/m² to 35 g/m². In certain embodiments, the first coating layer 20 is a film material, preferably formed using an extrusion process, having a basis weight of 20 g/m² to 30 g/m² and comprises 40% to 50% by weight recycled/reprocessed polypropylene, 30% to 40% by weight virgin polypropylene, 10% to 20% by weight low density polyethylene (LDPE), and 4% to 8% by weight colorant (e.g., color masterbatch), wherein the weight percentages are based on the total weight of the first coating layer 20. In certain embodiments, the first coating layer 20 is a film material, preferably formed using an extrusion process, having a basis weight of 25 g/m² to 35 g/m² and comprises 40% to 50% by weight recycled/reprocessed polypropylene, 35% to 45% by weight virgin polypropylene, 5% to 15% by weight low density polyethylene (LDPE), and 2% to 6% by weight colorant (e.g., color masterbatch), wherein the weight percentages are based on the total weight of the first coating layer 20.

In certain embodiments, the first coating layer 20 is a film material, preferably formed using an extrusion process, comprising at least one of a thermoplastic elastomer, a polypropylene, and a polyethylene, and having a basis weight of 20 g/m² to 30 g/m². In certain embodiments, the first coating layer 20 is a film material, preferably formed using an extrusion process, having a basis weight of 20 g/m² to 30 g/m² and comprises 40% to 50% by weight recycled/reprocessed polypropylene, 25% to 35% by weight thermoplastic elastomer, 10% to 20% by weight LDPE, 2% to 8% by weight colorant (e.g., color masterbatch), and 1% to 7% by weight virgin polypropylene, wherein the weight percentages are based on the total weight of the first coating layer 20.

In certain embodiments, when the first coating layer 20 of the present disclosure comprises a hot melt adhesive, the first coating layer 20 may have a basis weight of 5 g/m² to 30 g/m², including a basis weight of 5 g/m² to 25 g/m², a basis weight of 5 g/m² to 20 g/m², and also including a basis weight of 5 g/m² to 15 g/m².

The roofing underlayment 100 of the present disclosure includes a melt-blown nonwoven layer 30. As shown in FIG. 1, the melt-blown nonwoven layer 30 is the top surface layer of the roofing underlayment 100 on which an installer will walk as the roofing underlayment 100 is installed on a roof deck. It has been found that the melt-blown nonwoven layer 30 provides a relatively rough surface that promotes enhanced walkability, particularly as compared to conventional spunbond nonwoven layers and conventional melt-blown nonwoven layers, both of which have smooth surfaces. The rough surface primarily results from the melt-blown nonwoven layer 30 having a non-uniform basis weight caused by the large and uneven distribution of fibers that form the melt-blown nonwoven layer 30. The hardness of the fibers comprising the melt-blown nonwoven layer 30 also contributes to the rough surface. In contrast, conventional spunbond and melt-blown nonwoven layers tend to have a very even and consistent distribution of fibers and basis weight, which results in a smooth and soft surface. In certain embodiments, the melt-blown nonwoven layer 30 comprises fibers having a fiber diameter of 10 microns to 30 microns. It should be understood that when the melt-blown nonwoven layer 30 is formed, the fibers may randomly come into contact with one another and fuse together to form thicker, irregular fibers and dense clusters of fibers, which promotes the creation of an uneven and rough surface.

The melt-blown nonwoven layer 30 of the present disclosure may be formed from a variety of materials, most typically one or more thermoplastic materials. Exemplary materials suitable for forming the melt-blown nonwoven layer 30 of the present disclosure include, but are not limited to, a polyolefin (e.g., polyethylene, polypropylene), a polyester, a polystyrene, a polyamide, a polyurethane, a polycarbonate, an ethylene-acrylic copolymer, a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), and combinations or blends thereof. The material used to form the melt-blown nonwoven layer 30 of the present disclosure may be a virgin material, a recycled/reprocessed material, and combinations thereof. In certain embodiments, the melt-blown nonwoven layer 30 comprises a polyolefin. In certain embodiments, the melt-blown nonwoven layer 30 comprises a polyolefin and a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide). In certain embodiments, the melt-blown nonwoven layer 30 comprises at least one of a polypropylene and a polyethylene. The melt-blown nonwoven layer 30 of the present disclosure may also comprise additives such as colorants, pigments, antioxidants, U.V. stabilizers, fire retardants, fillers, and the like.

In certain embodiments, the melt-blown nonwoven layer 30 is formed with a thermoplastic composition having a melt flow index (MFI) of at least 100 g/10 minutes. All MFI values disclosed herein are based on test standard ASTM D1238 using a temperature of 230° C. and a weight of 2.16 kg. In certain embodiments, the melt-blown nonwoven layer 30 is formed with a thermoplastic composition having an MFI of 100 g/10 minutes to 1,900 g/10 minutes, including an MFI of 500 g/10 minutes to 1,800 g/10 minutes, an MFI of 750 g/10 minutes to 1,700 g/10 minutes, and also including an MFI of 1,000 g/10 minutes to 1,600 g/10 minutes. In certain embodiments, the melt-blown nonwoven layer 30 is formed with a thermoplastic composition having an MFI of 800 g/10 minutes to 1,200 g/10 minutes. In certain of the foregoing embodiments, the thermoplastic composition having an MFI of at least 100 g/10 minutes comprises a polyolefin. In certain of the foregoing embodiments, the thermoplastic composition having an MFI of at least 100 g/10 minutes comprises at least one of a polypropylene and a polyethylene. In certain embodiments, the thermoplastic composition having an MFI of at least 100 g/10 minutes, such as an MFI of 800 g/10 minutes to 1,200 g/10 minutes, may also comprise from 0.5% to 5% by weight (based on the total weight of the thermoplastic composition) additives such as colorants, pigments, antioxidants, U.V. stabilizers, fire retardants, fillers, and the like.

Use of a thermoplastic composition having an MFI of at least 100 g/10 minutes, such as an MFI of 800 g/10 minutes to 1,200 g/10 minutes, to form the melt-blown nonwoven layer 30 has been found to provide excellent resistance to pilling. Underlayments that utilize conventional nonwoven surfaces often suffer from pilling, which occurs when fibers break loose and ball up on the surface. It is believed that the relatively low MFI (i.e., less than 100 g/10 minutes) thermoplastic compositions used to make conventional nonwoven surfaces is a primary factor that contributes to pilling. The resistance to pilling exhibited by the melt-blown nonwoven layer 30 of the present disclosure is believed to result from the relatively high MFI (i.e., at least 100 g/10 minutes, such as 800 g/10 minutes to 1,200 g/10 minutes) thermoplastic composition used to form the melt-blown nonwoven layer 30. The higher MFI thermoplastic composition is more fluid and flows/melts to itself more readily during the melt-blowing process, which improves the bonding between the fibers during the melt-blowing process. Moreover, using a higher MFI thermoplastic composition results in a better bond with the first coating layer 20 as the higher MFI thermoplastic composition more readily melts and flows into the first coating layer 20, which promotes resistance to delamination and pilling.

The melt-blown nonwoven layer 30 of the present disclosure generally has a basis weight of 10 g/m$^2$ to 120 g/m$^2$. In certain embodiments, the melt-blown nonwoven layer 30 has a basis weight of 10 g/m$^2$ to 100 g/m$^2$. In certain embodiments, the melt-blown nonwoven layer 30 has a basis weight of 10 g/m$^2$ to 80 g/m$^2$. In certain embodiments, the melt-blown nonwoven layer 30 has a basis weight of 15 g/m$^2$ to 75 g/m$^2$. In certain embodiments, the melt-blown nonwoven layer 30 has a basis weight of 20 g/m$^2$ to 65 g/m$^2$. In certain embodiments, the melt-blown nonwoven layer 30 has a basis weight of 25 g/m$^2$ to 55 g/m$^2$. In certain embodiments, the melt-blown nonwoven layer 30 has a basis weight of 30 g/m$^2$ to 45 g/m$^2$. In certain embodiments, the melt-blown nonwoven layer 30 comprises at least one of a polypropylene and a polyethylene, and has a basis weight of 25 g/m$^2$ to 50 g/m$^2$. In certain embodiments, the melt-blown nonwoven layer 30 has a basis weight of 25 g/m$^2$ to 35 g/m$^2$ and comprises at least one of a polypropylene and a polyethylene, and a U.V. stabilizer. In certain embodiments, the melt-blown nonwoven layer 30 has a basis weight of 35 g/m$^2$ to 45 g/m$^2$ and comprises at least one of a polypropylene and a polyethylene, and a U.V. stabilizer. In certain embodiments, the melt-blown nonwoven layer 30 has a basis weight of 40 g/m$^2$ to 50 g/m$^2$ and comprises at least one of a polypropylene and a polyethylene, and a U.V. stabilizer.

Figure 2:
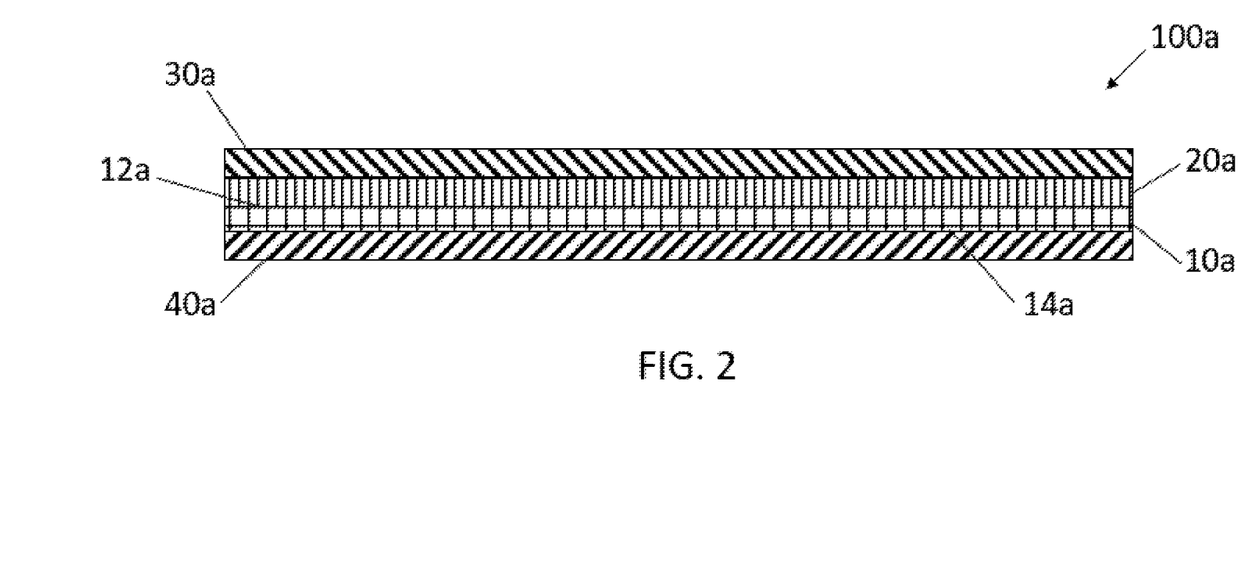
FIG. 2 is a cross-sectional view of an embodiment of a roofing underlayment according to the present disclosure.

Referring now to FIG. 2, an exemplary embodiment of a roofing underlayment 100a of the present disclosure is shown. The roofing underlayment 100a is structured similarly to the roofing underlayment 100 illustrated in FIG. 1 except the roofing underlayment 100a includes a second coating layer 40a. As seen in FIG. 2, the roofing underlayment 100a comprises a base layer 10a having a first surface 12a (e.g., a top surface) and a second surface 14a (e.g., a bottom surface), a first coating layer 20a adhered to the first surface 12a of the base layer 10a, and a second coating layer 40a adhered to the second surface 14a of the base layer 10a. The roofing underlayment 100a also includes a melt-blown nonwoven layer 30a adhered to the first coating layer 20a. The various embodiments of the individual layers 10, 20, 30 of the roofing underlayment 100 described above with reference to FIG. 1 may also be used for the individual layers 10a, 20a, 30a of the roofing underlayment 100a illustrated in FIG. 2.

As mentioned above, the roofing underlayment 100a shown in FIG. 2 includes a second coating layer 40a adhered to the second surface 14a of the base layer 10a. The second coating layer 40a of the present disclosure is generally water impermeable and may be formed from a variety of materials, most typically one or more polymeric materials. Exemplary materials suitable for forming the second coating layer 40a of the present disclosure include, but are not limited to, a polyolefin (e.g., a polyethylene, a polypropylene), a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), a polyester, a polystyrene, a polyamide, a polyurethane, a polycarbonate, an ethylene-acrylic copolymer, an ethylene methyl acrylate (EMA) copolymer, an ethylene vinyl acetate (EVA) copolymer, and combinations thereof. The material used to form the second coating layer 40a of the present disclosure may be a virgin material, a recycled/reprocessed material, and combinations thereof. In certain embodiments, the second coating layer 40a comprises at least one of a polyolefin and a thermoplastic elastomer. In certain embodiments, the second coating layer 40a comprises at least one of a polypropylene, a polyethylene, and a thermoplastic elastomer. The second coating layer 40a of the present disclosure may also comprise additives such as colorants, pigments, antioxidants, U.V. stabilizers, fire retardants, fillers, and the like.

The second coating layer 40a of the present disclosure may be structured in a variety of ways. For example, the second coating layer 40a may be a woven material, a nonwoven material, or a film material. In certain embodiments, the second coating layer 40a is a film material that is extruded onto or laminated onto (e.g., using an adhesive) the second surface 14a of the base layer 10a. In certain embodiments, the second coating layer 40a is a multi-layer film material comprising a thermoplastic elastomer layer and a polyolefin layer that is formed using a co-extrusion process. In certain embodiments, the thermoplastic elastomer layer of the second coating layer 40a comprises a thermoplastic elastomer and a polyolefin, such as a polypropylene and/or a polyethylene. In certain embodiments, the polyolefin layer of the second coating layer 40a comprises at least one of a polypropylene and a polyethylene. The thermoplastic elastomer layer and/or the polyolefin layer of the second coating layer 40a of the present disclosure may also comprise additives such as colorants, pigments, antioxidants, U.V. stabilizers, fire retardants, fillers, and the like.

In certain embodiments, the second coating layer 40a is applied to the second surface 14a of the base layer 10a (which may already include a first coating layer 20a adhered to the first surface 12a of the base layer 10a and a melt-blown nonwoven layer 30a adhered to the first coating layer 20a) as a curtain of molten material comprising a thermoplastic elastomer extrudate and a polyolefin extrudate, which are laminated together to form the roofing underlayment 100a. Preferably, the polyolefin layer of the second coating layer 40a is adhered to the second surface 14a of the base layer 10a and the thermoplastic elastomer layer of the second coating layer 40a forms an exterior surface (i.e., the surface intended to contact a roof deck or other substrate) of the roofing underlayment 100a. Because of the rubbery nature and gripping ability associated with thermoplastic elastomer materials, including a thermoplastic elastomer layer as the portion of the second coating layer 40a that forms the exterior surface of the roofing underlayment 100a results in enhanced traction.

In certain embodiments, the second coating layer 40a of the present disclosure has a basis weight of 10 $g/m^2$ to 80 $g/m^2$. In certain embodiments, the second coating layer 40a has a basis weight of 15 $g/m^2$ to 75 $g/m^2$. In certain embodiments, the second coating layer 40a has a basis weight of 20 $g/m^2$ to 50 $g/m^2$. In certain embodiments, the second coating layer 40a has a basis weight of 20 $g/m^2$ to 30 $g/m^2$.

In certain embodiments, the second coating layer 40a is a multi-layer film material, preferably formed using a co-extrusion process, comprising a polyolefin layer having a basis weight of 10.8 $g/m^2$ to 28.8 $g/m^2$ and a thermoplastic elastomer layer having a basis weight of 4.2 $g/m^2$ to 11.2 $g/m^2$. In certain embodiments, the second coating layer 40a is a multi-layer film material, preferably formed using a co-extrusion process, comprising a polyolefin layer having a basis weight of 10.8 $g/m^2$ to 25.2 $g/m^2$ and a thermoplastic elastomer layer having a basis weight of 4.2 $g/m^2$ to 9.8 $g/m^2$. In certain embodiments, the second coating layer 40a is a multi-layer film material, preferably formed using a co-extrusion process, comprising a polyolefin layer having a basis weight of 14.4 $g/m^2$ to 21.6 $g/m^2$ and a thermoplastic elastomer layer having a basis weight of 5.6 $g/m^2$ to 8.4 $g/m^2$.

In certain embodiments, the second coating layer 40a is a multi-layer film material, preferably formed using a co-extrusion process, comprising a polyolefin layer having a basis weight of 15 $g/m^2$ to 25 $g/m^2$ and a thermoplastic elastomer layer having a basis weight of 2 $g/m^2$ to 10 $g/m^2$. In certain embodiments, the polyolefin layer of the second coating layer 40a comprises 40% to 50% by weight recycled/reprocessed polypropylene, 30% to 40% by weight virgin polypropylene, 10% to 20% by weight LDPE, and 2% to 6% by weight colorant (e.g., color masterbatch), wherein the weight percentages are based on the total weight of the polyolefin layer; and the thermoplastic elastomer layer of the second coating layer 40a comprises 40% to 55% by weight thermoplastic elastomer, 25% to 45% by weight virgin polypropylene, 10% to 20% by weight LDPE, and 2% to 6% by weight colorant (e.g., color masterbatch), wherein the weight percentages are based on the total weight of the thermoplastic elastomer layer.

Figure 3:
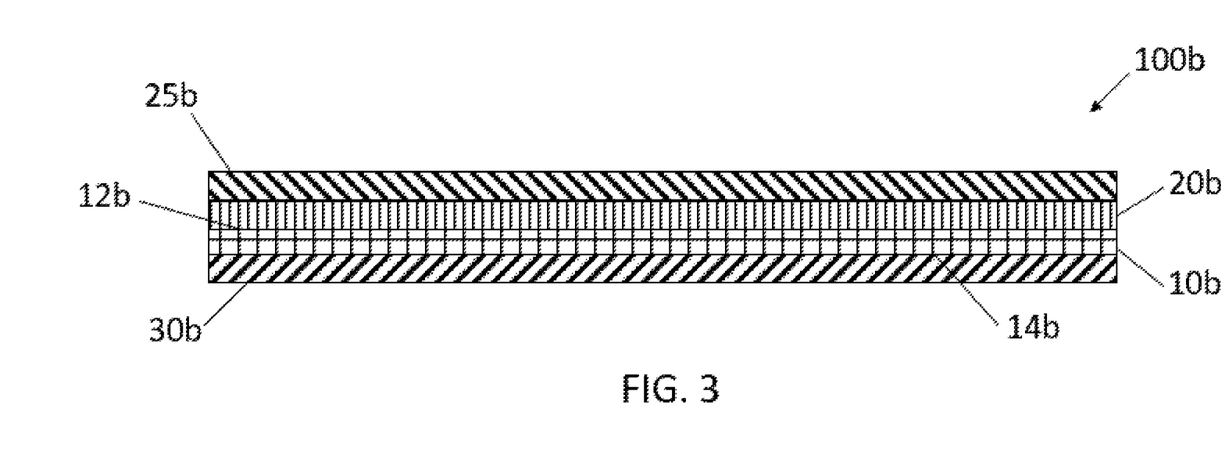
FIG. 3 is a cross-sectional view of an embodiment of a roofing underlayment according to the present disclosure.

Referring now to FIG. 3, an exemplary embodiment of a roofing underlayment 100b of the present disclosure is shown. As seen in FIG. 3, the roofing underlayment 100b comprises a base layer 10b having a first surface 12b (e.g., a top surface) and a second surface 14b (e.g., a bottom surface), a first coating layer 20b adhered to the first surface 12b of the base layer 10b, and a top surface layer 25b adhered to the first coating layer 20b. The roofing underlayment 100b also includes a melt-blown nonwoven layer 30b adhered to the second surface 14b of the base layer 10b. The various embodiments of the individual layers 10, 20, 30 of the roofing underlayment 100 described above with reference to FIG. 1 may also be used for the individual layers 10b, 20b, 30b of the roofing underlayment 100b illustrated in FIG. 3.

As mentioned above, the roofing underlayment 100b shown in FIG. 3 includes a top surface layer 25b adhered to the first coating layer 20b. The top surface layer 25b may be formed from a variety of materials, most typically one or more polymeric materials. Exemplary materials suitable for forming the top surface layer 25b include, but are not limited to, a polyolefin (e.g., a polyethylene, a polypropylene), a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), a polyester, a polystyrene, a polyamide, a polyurethane, a polycarbonate, an ethylene-acrylic copolymer, and combinations thereof. The material used to form the top surface layer 25b may be a virgin material, a recycled/reprocessed material, and combinations thereof. In certain embodiments, the top surface layer 25b comprises a polyolefin. In certain embodiments, the top surface layer 25b comprises at least one of a polypropylene and a polyethylene. The top surface layer 25b may also comprise additives such as colorants, pigments, antioxidants, U.V. stabilizers, fire retardants, fillers, and the like.

The top surface layer 25b shown in FIG. 3 may be structured in a variety of ways. For example, the top surface layer 25b may be a woven material, a nonwoven material, or a film material. In certain embodiments, the top surface layer 25b is a spunbond nonwoven material. In general, and regardless of form, the top surface layer 25b has a basis weight of 10 g/m$^2$ to 120 g/m$^2$, including a basis weight of 10 g/m$^2$ to 100 g/m$^2$, a basis weight of 10 g/m$^2$ to 80 g/m$^2$, a basis weight of 15 g/m$^2$ to 80 g/m$^2$, a basis weight of 25 g/m$^2$ to 75 g/m$^2$, a basis weight of 35 g/m$^2$ to 75 g/m$^2$, a basis weight of 40 g/m$^2$ to 65 g/m$^2$, and also including a basis weight of 45 g/m$^2$ to 55 g/m$^2$. In certain embodiments, the top surface layer 25b is a spunbond nonwoven material comprising at least one of a polyolefin and a thermoplastic elastomer, and having a basis weight of 45 g/m$^2$ to 55 g/m$^2$. The inclusion of a thermoplastic elastomer material in the top surface layer 25b can promote enhanced walkability due to the rubbery nature and gripping ability associated with thermoplastic elastomer materials.

With continued reference to FIG. 3, the roofing underlayment 100b includes a melt-blown nonwoven layer 30b adhered to the second surface 14b of the base layer 10b. Just as the melt-blown nonwoven layer 30 described above and shown in FIG. 1 provides a rough surface to promote enhanced walkability, the melt-blown nonwoven layer 30b shown in FIG. 3 provides a rough surface to grip a roof deck or other substrate to promote enhanced traction. As mentioned above, the melt-blown nonwoven layer 30b shown in FIG. 3 may be configured according to any one or more of the embodiments of the melt-blown nonwoven layer 30 previously described in connection with FIG. 1.

Figure 4:
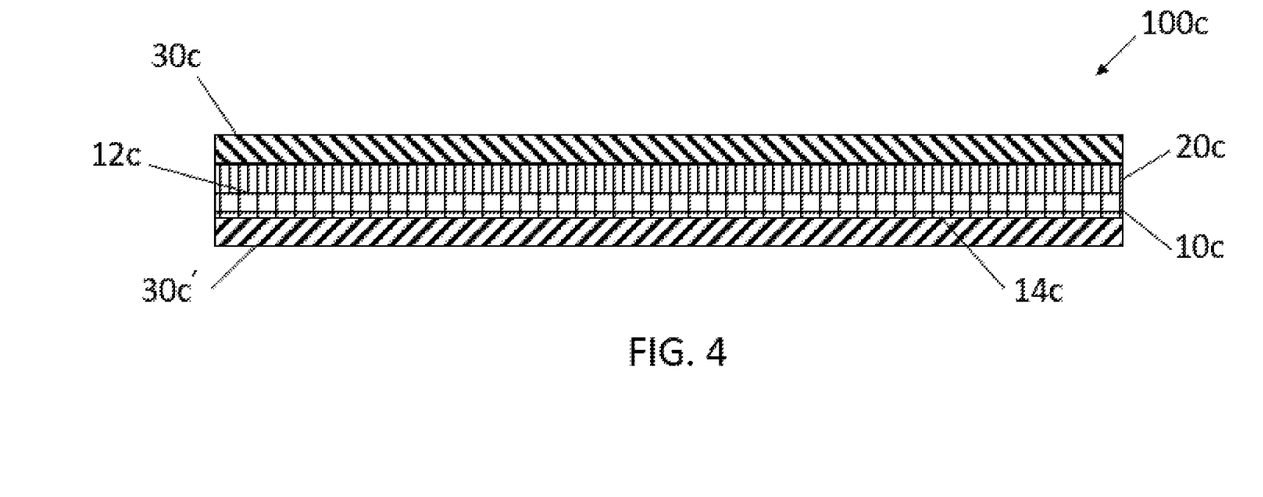
FIG. 4 is a cross-sectional view of an embodiment of a roofing underlayment according to the present disclosure.

Turning now to FIG. 4, an exemplary embodiment of a roofing underlayment 100c of the present disclosure is shown. As seen in FIG. 4, the roofing underlayment 100b comprises a base layer 10c having a first surface 12c (e.g., a top surface) and a second surface 14c (e.g., a bottom surface), and a first coating layer 20c adhered to the first surface 12c of the base layer 10c. The roofing underlayment 100c also includes a first melt-blown nonwoven layer 30c adhered to the first coating layer 20c and a second melt-blown nonwoven layer 30c' adhered to the second surface 14c of the base layer 10c. Any of the various embodiments of the individual layers 10, 20, 30 of the roofing underlayment 100 described above with reference to FIG. 1 may also be used for the individual layers 10c, 20c, 30c, 30c' of the roofing underlayment 100c illustrated in FIG. 4.

As shown in FIG. 4, the roofing underlayment 100c includes a first melt-blown nonwoven layer 30c adhered to the first coating layer 20c, and a second melt-blown nonwoven layer 30c' adhered to the second surface 14c of the base layer 10c. In the embodiment shown in FIG. 4, the first melt-blown nonwoven layer 30c is the top surface layer of the roofing underlayment 100c on which an installer will walk as the roofing underlayment 100c is installed on a roof deck or other substrate, and the second melt-blown nonwoven layer 30c' is the bottom surface layer of the roofing underlayment 100c intended to contact the roof deck or other substrate. The first and second melt-blown nonwoven layers 30c, 30c' provide rough surfaces that promote enhanced walkability and enhanced traction.

As mentioned above, the first and second melt-blown nonwoven layers 30c, 30c' may be configured in accordance with any one or more of the embodiments described above with respect to the melt-blown nonwoven layer 30 shown in FIG. 1. In certain embodiments, the first and second melt-blown nonwoven layers 30c, 30c' are the same. In certain embodiments, the first and second melt-blown nonwoven layers 30c, 30c' differ in at least one characteristic. For example, the first and second melt-blown nonwoven layers 30c, 30c' may have a different basis weight and/or comprise different materials.

The roofing underlayments 100, 100a, 100b, 100c of the present disclosure generally have a basis weight of 75 g/m$^2$ to 460 g/m$^2$. In certain embodiments, the roofing underlayments 100, 100a, 100b, 100c have a basis weight of 100 g/m$^2$ to 400 g/m$^2$. In certain embodiments, the roofing underlayments 100, 100a, 100b, 100c have a basis weight of 150 g/m$^2$ to 350 g/m$^2$. In certain embodiments, the roofing underlayments 100, 100a, 100b, 100c have a basis weight of 200 g/m$^2$ to 300 g/m$^2$. In certain embodiments, the roofing underlayments 100, 100a, 100b, 100c have a basis weight of 210 g/m$^2$ to 275 g/m$^2$. In certain embodiments, the roofing underlayments 100, 100a, 100b, 100c have a basis weight of 220 g/m$^2$ to 250 g/m$^2$. In certain embodiments, the roofing underlayments 100, 100a, 100b, 100c have a basis weight of 220 g/m$^2$ to 230 g/m$^2$. In certain embodiments, the roofing underlayments 100, 100a, 100b, 100c have a basis weight of 230 g/m$^2$ to 265 g/m$^2$. In certain embodiments, the roofing underlayments 100, 100a, 100b, 100c have a basis weight of 235 g/m$^2$ to 250 g/m$^2$. In certain embodiments, the roofing underlayments 100, 100a, 100b, 100c have a basis weight of 180 g/m$^2$ to 250 g/m$^2$. In certain embodiments, the roofing underlayments 100, 100a, 100b, 100c have a basis weight of 180 g/m$^2$ to 195 g/m$^2$.

The roofing underlayments 100, 100a, 100b, 100c of the present disclosure may be configured as self-adhered (e.g., peel and stick) underlayments. In such embodiments, a layer of adhesive material (not shown) (e.g., an asphalt-based adhesive) is applied to a bottommost surface of the roofing underlayment 100, 100a, 100b, 100c, and the layer of adhesive material functions to attach the roofing underlayment 100, 100a, 100b, 100c to a substrate, such as a roof deck, without using fasteners (e.g., nails, staples). The layer of adhesive material may be covered with a release material as is customary in the art. In other embodiments, the roofing underlayments 100, 100a, 100b, 100c of the present disclosure are attached to a substrate, such as a roof deck, using conventional fasteners (e.g., nails, staples).

The roofing underlayments 100, 100a, 100b, 100c of the present disclosure may be formed using conventional manufacturing techniques known to those of skill in the art. In certain embodiments, the roofing underlayments 100, 100a, 100b, 100c may be formed by adding each layer individually to build up the roofing underlayment 100, 100a, 100b, 100c. In these or other embodiments, certain layers (e.g., the melt-blown nonwoven layer, the base layer) may be pre-formed and provided in a process in which additional layers (e.g., the first coating layer, the second coating layer) are laminated or otherwise joined to the pre-formed layers. In certain embodiments, all of the layers may be stacked or arranged together and laminated in a single lamination process. In one or more embodiments, the layers may be bonded or otherwise adhered together by chemical bonding, mechanical bonding, and/or thermal bonding. Exemplary methods of bonding the layers include, but are not limited to, heat pressing, calendaring, needling, ultrasonic bonding or welding, adhesives, tie layers, and/or point bonding.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The underlayments of the present disclosure can comprise, consist of, or consist essentially of the essential elements and limitations of the disclosure as described herein, as well as any additional or optional components or limitations described herein or otherwise known to be useful in underlayment applications.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. Furthermore, the phrase "at least one of A, B, and C" should be interpreted as "only A or only B or only C or any combinations thereof." In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

What is claimed is:

1. A roofing underlayment comprising:
    a base layer;
    a first coating layer adhered to a first surface of the base layer; and
    a melt-blown nonwoven layer adhered to the first coating layer,
    wherein the melt-blown nonwoven layer has a basis weight of 10 $g/m^2$ to 120 $g/m^2$ and comprises a thermoplastic composition having a melt flow index of 100 g/10 minutes to 1,900 g/10 minutes.

2. The roofing underlayment according to claim 1, wherein the thermoplastic composition comprises at least one of a polyolefin, a polyester, a polystyrene, a polyamide, a polyurethane, a polycarbonate, and an ethylene acrylic copolymer.

3. The roofing underlayment according to claim 1, wherein the melt-blown nonwoven layer has a basis weight of 15 $g/m^2$ to 75 $g/m^2$ and the thermoplastic composition comprises a polyolefin, and wherein the thermoplastic composition has a melt flow index of 500 g/10 minutes to 1,800 g/10 minutes.

4. The roofing underlayment according to claim 1, wherein the melt-blown nonwoven layer has a basis weight of 25 $g/m^2$ to 50 $g/m^2$ and the thermoplastic composition comprises at least one of a polypropylene and a polyethylene, and wherein the thermoplastic composition has a melt flow index of 800 g/10 minutes to 1,200 g/10 minutes.

5. The roofing underlayment according to claim 1, wherein the base layer is selected from a woven material, a nonwoven material, and a film material;
    wherein the base layer comprises at least one of a polyolefin, a polyester, a polystyrene, a polyamide, a polyurethane, a polycarbonate, an ethylene acrylic copolymer, and a glass; and
    wherein the base layer has a basis weight of 25 $g/m^2$ to 250 $g/m^2$.

6. The roofing underlayment according to claim 5, wherein the base layer is a woven material having a basis weight of 85 $g/m^2$ to 105 $g/m^2$ and comprises a polypropylene, a filler material, and a U.V. stabilizer.

7. The roofing underlayment according to claim 5, wherein the base layer comprises a spunbond nonwoven material having a basis weight of 135 $g/m^2$ to 145 $g/m^2$ and comprises a polypropylene.

8. The roofing underlayment according to claim 1, wherein the first coating layer is selected from a woven material, a nonwoven material, and a film material;
    wherein the first coating layer comprises at least one of a polyolefin, a thermoplastic elastomer, a polyester, a polystyrene, a polyamide, a polyurethane, a polycarbonate, an ethylene acrylic copolymer, and a hot melt adhesive; and
    wherein the first coating layer has a basis weight of 5 $g/m^2$ to 50 $g/m^2$.

9. The roofing underlayment according to claim 8, wherein the first coating layer is a film material having a basis weight of 20 $g/m^2$ to 50 $g/m^2$ and comprises 40% to 50% by weight recycled/reprocessed polypropylene, 30% to 40% by weight virgin polypropylene, 10% to 20% by weight low density polyethylene, and 4% to 8% by weight colorant, wherein the weight percentages are based on the total weight of the first coating layer.

10. The roofing underlayment according to claim 8, wherein the first coating layer is a film material having a basis weight of 20 g/m² to 30 g/m² and comprises 40% to 50% by weight recycled/reprocessed polypropylene, 25% to 35% by weight thermoplastic elastomer, 10% to 20% by weight low density polyethylene, 2% to 8% by weight colorant, and 1% to 7% by weight virgin polypropylene, wherein the weight percentages are based on the total weight of the first coating layer.

11. The roofing underlayment according to claim 1, further comprising a second coating layer adhered to a second surface of the base layer opposite the first surface.

12. The roofing underlayment according to claim 11, wherein the second coating layer is a co-extruded layer comprising a thermoplastic elastomer layer and a polyolefin layer and has a basis weight of 10 g/m² to 80 g/m², and wherein the polyolefin layer is adhered to the second surface of the base layer.

13. The roofing underlayment according to claim 12, wherein the polyolefin layer has a basis weight of 15 g/m² to 25 g/m² and comprises 40% to 50% by weight recycled/reprocessed polypropylene, 30% to 40% by weight virgin polypropylene, 10% to 20% by weight low density polyethylene, and 2% to 6% by weight colorant, based on the total weight of the polyolefin layer; and
wherein the thermoplastic elastomer layer has a basis weight of 2 g/m² to 10 g/m² and comprises 40% to 55% by weight thermoplastic elastomer, 25% to 45% by weight virgin polypropylene, 10% to 20% by weight low density polyethylene, and 2% to 6% by weight colorant, based on the total weight of the thermoplastic elastomer layer.

14. The roofing underlayment according to claim 1, wherein the roofing underlayment has a basis weight of 75 g/m² to 460 g/m².

15. A roofing underlayment comprising:
a base layer;
a first coating layer adhered to a first surface of the base layer;
a first melt-blown nonwoven layer adhered to the first coating layer; and
a second melt-blown nonwoven layer adhered to a second surface of the base layer.

16. The roofing underlayment according to claim 15, wherein the first melt-blown nonwoven layer has a basis weight of 10 g/m² to 120 g/m² and comprises at least one of a polyolefin, a polyester, a polystyrene, a polyamide, a polyurethane, a polycarbonate, and an ethylene acrylic copolymer; and
wherein the second melt-blown nonwoven layer has a basis weight of 10 g/m² to 120 g/m² and comprises at least one of a polyolefin, a polyester, a polystyrene, a polyamide, a polyurethane, a polycarbonate, and an ethylene acrylic copolymer.

17. The roofing underlayment according to claim 15, wherein the first melt-blown nonwoven layer has a basis weight of 10 g/m² to 120 g/m² and comprises a first thermoplastic composition having a melt flow index of 100 g/10 minutes to 1,900 g/10 minutes; and
wherein the second melt-blown nonwoven layer has a basis weight of 10 g/m² to 120 g/m² and comprises a second thermoplastic composition having a melt flow index of 100 g/10 minutes to 1,900 g/10 minutes.

18. The roofing underlayment according to claim 15, wherein the first melt-blown nonwoven layer has a basis weight of 25 g/m² to 50 g/m² and comprises a first thermoplastic composition comprising at least one of a polypropylene and a polyethylene, and wherein the first thermoplastic composition has a melt flow index of 800 g/10 minutes to 1,200 g/10 minutes; and
wherein the second melt-blown nonwoven layer has a basis weight of 25 g/m² to 50 g/m² and comprises a second thermoplastic composition comprising at least one of a polypropylene and a polyethylene, and wherein the second thermoplastic composition has a melt flow index of 800 g/10 minutes to 1,200 g/10 minutes.

19. The roofing underlayment according to claim 15, wherein the base layer is a woven material having a basis weight of 85 g/m² to 105 g/m² and comprises a polypropylene, a filler material, and a U.V. stabilizer.

20. The roofing underlayment according to claim 15, wherein the base layer comprises a spunbond nonwoven material having a basis weight of 135 g/m² to 145 g/m² and comprises a polypropylene.

21. The roofing underlayment according to claim 15, wherein the first coating layer is selected from a woven material, a nonwoven material, and a film material;
wherein the first coating layer comprises at least one of a polyolefin, a thermoplastic elastomer, a polyester, a polystyrene, a polyamide, a polyurethane, a polycarbonate, an ethylene acrylic copolymer, and a hot melt adhesive; and
wherein the first coating layer has a basis weight of 5 g/m² to 50 g/m².

22. The roofing underlayment according to claim 15, wherein the roofing underlayment has a basis weight of 75 g/m² to 460 g/m².

* * * * *